United States Patent
Chiu et al.

(10) Patent No.: US 11,938,694 B2
(45) Date of Patent: Mar. 26, 2024

(54) HIGH SPEED INJECTION MOLDING WITH HEAT/COOL CYCLE FOR MAKING OPTICAL ARTICLES

(71) Applicant: Essilor International, Charenton-le-Pont (FR)

(72) Inventors: Hao-Wen Chiu, Dallas, TX (US); Shannon Loiselle, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 408 days.

(21) Appl. No.: 16/754,883

(22) PCT Filed: Oct. 8, 2018

(86) PCT No.: PCT/EP2018/077332
§ 371 (c)(1),
(2) Date: Apr. 9, 2020

(87) PCT Pub. No.: WO2019/072767
PCT Pub. Date: Apr. 18, 2019

(65) Prior Publication Data
US 2020/0316886 A1    Oct. 8, 2020

(30) Foreign Application Priority Data
Oct. 12, 2017 (EP) .................................... 17306380

(51) Int. Cl.
*B29D 11/00* (2006.01)
*B29C 45/00* (2006.01)
(Continued)

(52) U.S. Cl.
CPC .... *B29D 11/00269* (2013.01); *B29C 45/0025* (2013.01); *B29C 45/372* (2013.01);
(Continued)

(58) Field of Classification Search
CPC ........ B29D 11/00269; B29D 11/00432; B29C 45/0025; B29C 45/372; B29C 45/7306;
(Continued)

(56) References Cited

U.S. PATENT DOCUMENTS 6,171,527 B1    1/2001  Warino et al.
6,290,882 B1 *  9/2001  Maus ............... B29D 11/00269
                                        264/328.8

(Continued)

FOREIGN PATENT DOCUMENTS

CN         1959441 A      5/2007
CN       101909847 A     12/2010
(Continued)

OTHER PUBLICATIONS en.wikipedia.org/wiki/polycarbonate, Jun. 1, 2016. (Year: 2016).*
(Continued)

*Primary Examiner* — S. Behrooz Ghorishi
*Assistant Examiner* — Gregory C. Grosso
(74) *Attorney, Agent, or Firm* — Norton Rose Fulbright US LLP

(57) ABSTRACT

A method for producing an optical article having a Fresnel microstructure and an injection molding system for producing such an article. The method includes heating and cooling (Continued)

a mold and applying a pressure to a thermoplastic material during injection molding of the optical article to facilitate formation of the Fresnel microstructure.

13 Claims, 4 Drawing Sheets

(51) Int. Cl.
*B29C 45/37* (2006.01)
*B29C 45/73* (2006.01)
*B29C 45/78* (2006.01)
*G02B 3/08* (2006.01)
*B29K 21/00* (2006.01)
*B29K 27/06* (2006.01)
*B29K 75/00* (2006.01)
*B29L 11/00* (2006.01)

(52) U.S. Cl.
CPC .......... *B29C 45/7306* (2013.01); *B29C 45/78* (2013.01); *B29D 11/00432* (2013.01); *G02B 3/08* (2013.01); *B29C 2045/7393* (2013.01); *B29C 2945/7604* (2013.01); *B29C 2945/7626* (2013.01); *B29K 2021/003* (2013.01); *B29K 2027/06* (2013.01); *B29K 2075/00* (2013.01); *B29L 2011/005* (2013.01)

(58) Field of Classification Search
CPC ............ B29C 45/78; B29C 2045/7393; B29C 2945/7604; B29C 2945/7626; G02B 3/08; B29K 2021/003; B29K 2027/06; B29K 2075/00; B29L 2011/005
USPC ........................................................ 264/1.1
See application file for complete search history.

(56) References Cited

U.S. PATENT DOCUMENTS

| | | | |
|---|---|---|---|
| 2003/0111749 A1 | 6/2003 | Chiu et al. | |
| 2009/0291206 A1* | 11/2009 | Jiang ................ | B29D 11/00269 427/164 |
| 2011/0164329 A1* | 7/2011 | Jiang ....................... | G02B 1/10 427/164 |
| 2012/0171452 A1 | 7/2012 | Schmidt et al. | |
| 2014/0211152 A1* | 7/2014 | Colas ....................... | G02C 7/08 351/159.75 |

FOREIGN PATENT DOCUMENTS

| | | |
|---|---|---|
| CN | 101981119 A | 2/2011 |
| CN | 103128908 A | 6/2013 |
| EP | 1324874 | 7/2003 |
| EP | 2594392 | 5/2013 |
| JP | S 59104601 | 6/1984 |
| JP | S6442216 A | 2/1989 |
| JP | H11129305 A | 5/1999 |

OTHER PUBLICATIONS

First Office Action from The State Intellectual Property Office of People's Republic of China issued in corresponding Chinese patent application 201880066570, dated May 24, 2021.

Search Report from The State Intellectual Property Office of People's Republic of China issued in corresponding Chinese patent application 201880066570, dated Apr. 29, 2021.

International Search Report Issued in Corresponding PCT Patent Application No. PCT/EP2018/077332, dated Nov. 7, 2018.

* cited by examiner

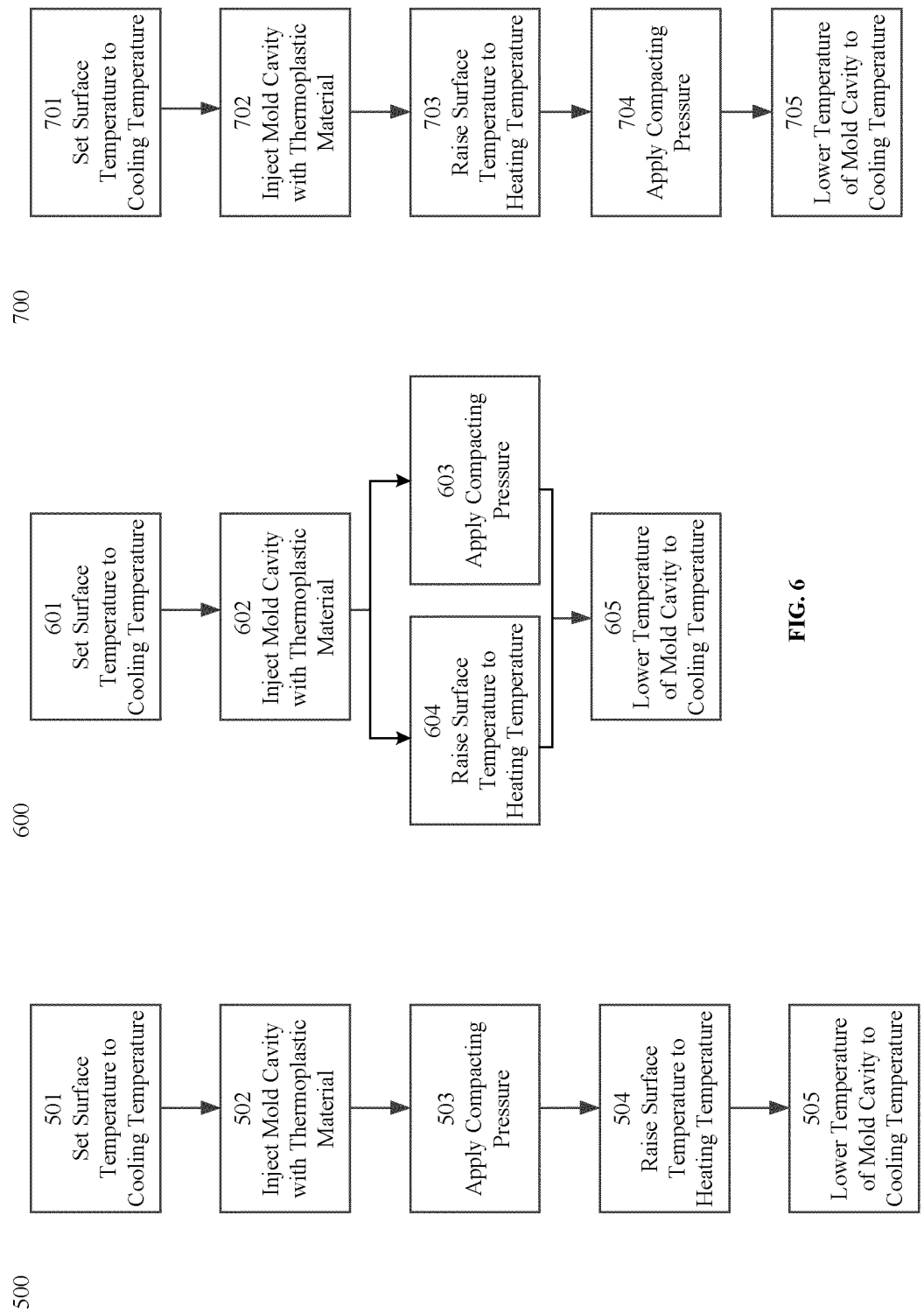

HIGH SPEED INJECTION MOLDING WITH HEAT/COOL CYCLE FOR MAKING OPTICAL ARTICLES

CROSS-REFERENCE TO RELATED APPLICATIONS

This application is a national phase application under 35 U.S.C. § 371 of International Application No. PCT/EP2018/077332 filed 8 Oct. 2018, which claims priority to European Patent Application No. 17306380.1 filed 12 Oct. 2017. The entire contents of each of the above-referenced disclosures is specifically incorporated by reference herein without disclaimer.

BACKGROUND

1. Field of Invention

The present disclosure relates generally to methods for making optical articles having a Fresnel microstructure by using heating and cooling cycles and applying a pressure during injection molding; such methods may include using thermoplastic material to form optical articles having a Fresnel microstructure.

2. Description of Related Art

To obtain optical articles possessing optical qualities suitable for their purpose, certain precautions need to be taken during manufacture, in particular to avoid irregular deformations or the presence of residual internal tensions. Such deformations or tensions give rise to undesirable optical aberrations such as, for example, double refraction.

To produce an optical article using injection molding, a mold is closed and a material is injected into a cavity of the mold. After the cavity has been filled with the material, the material is cooled, the mold is opened, and the article is ejected. The process may then be repeated. The whole process occurs at a constant cavity temperature substantially lower than the softening temperature of the material.

During the injection stage of the process, the injected material is forced into the cavity through relatively small passages called runners and gates. Since the cavity temperature is below the softening temperature, injected material in contact with the surfaces of the mold cavity freezes off immediately, forming a cold skin layer. Thickness requirements of optical articles, therefore, present difficulties in filling a cavity because the formation of a cold skin layer greatly narrows the melt flow passages and dramatically increases flow resistance. Moreover, optical articles with relatively large diameters present difficulties in filling a cavity because of increased flow paths of the material. That is, a large flow path coupled with an increased flow resistance results in a melt front that tends to freeze off prematurely leading to undesirable and unusable optical articles. Furthermore, when an optical article has microstructures with sharp corners, significant pressure buildups occur at the corners that prevent the material from properly forming the microstructures. This buildup is amplified by the freeze-off effect, which results in significant imperfections in the final product and in replicating the microstructures.

SUMMARY

The present disclosure addresses the need for an efficient and cost effective method of producing an optical article having a Fresnel microstructure and a thermoplastic lens material. In this manner, it is desirable for the resulting optical article to be flexible, thin, easily reproduced, and for the Fresnel microstructure of the optical article to be produced precisely to ensure that the optical article has optimal optical qualities. The inventors have found that using an injection molding technique utilizing heating and cooling cycles and applying a pressure during injection molding enables the production of flexible, thin, easily reproduced thermoplastic optical articles having a Fresnel microstructure with precise geometrical and optical characteristics.

In some aspects, a method for producing an optical article comprises the steps of setting a surface temperature of a mold cavity to a cooling temperature at least 5° F. lower than a softening temperature of a thermoplastic material; injecting the mold cavity with the thermoplastic material, the mold cavity including a Fresnel surface; applying a compacting pressure to the thermoplastic material; raising the surface temperature of the mold cavity to a heating temperature at least 20° F. higher than the cooling temperature; and lowering a temperature of the mold cavity to the cooling temperature to form an optical article. In some aspects, the thermoplastic material may be a thermoplastic polyurethane (TPU), polyvinyl chloride (PVC), or thermoplastic elastomer (TPE). In some aspects, the heating temperature may be approximately 30° F. to 100° F. higher than the cooling temperature. In some aspects, applying the compacting pressure to the thermoplastic material and raising the surface temperature of the mold cavity may begin simultaneously. In some aspects, raising the surface temperature of the molding cavity may begin before applying the compacting pressure to the thermoplastic material.

In some aspects, the Fresnel surface may be configured to form a Fresnel microstructure, the Fresnel microstructure having a step height ranging from approximately 10 μm to 500 μm and a step width ranging from approximately 5 μm to 250 μm.

In some aspects, the compacting pressure and/or the heating temperature may be maintained for 1, 2, 3, 4, or 5 seconds. In some aspects, the compacting pressure and/or the heating temperature may be maintained for at least 5 seconds. In some aspects, the compacting pressure and the heating pressure may be maintained for 6, 7 8, 9, 10, 15, 20, 25, 30, 35, 40, 45, 50, to 60 seconds, or any time therein.

In some aspects, an injection molding system for producing an injection molded optical article comprises: a mold having a mold cavity for receiving a thermoplastic material, the mold cavity including a Fresnel surface; a heat source in thermal connection with the mold; and a processor. The processor may be configured to: control the heat source to set a surface temperature of the mold cavity to a cooling temperature at least 5° F. lower than a softening temperature of the thermoplastic material; control the heat source to raise the surface temperature of the mold cavity to a heating temperature at least 20° F. higher than the cooling temperature; and control the heat source to lower a temperature of the mold cavity to the cooling temperature. In some aspects, the injection molding system includes a thermoplastic injector configured to: inject the thermoplastic material into the mold cavity of the mold; and apply a compacting pressure at most 20,000 psi to the thermoplastic material. In some aspects, applying the compacting pressure to the thermoplastic material and raising the surface temperature of the mold cavity begin simultaneously. In some aspects, raising the surface temperature of the molding cavity may begin before applying the compacting pressure to the thermoplastic material. In some aspects, the Fresnel surface may be configured to form a Fresnel microstructure. In some aspects, the Fresnel microstructure has a step height ranging from approximately 10 μm to 500 μm and a step width ranging from approximately 5 μm to 250 μm.

In some aspects, the processor may be configured to: maintain the heating temperature for a period of time, and the injector may be configured to maintain the compacting pressure for a period of time. In some aspects, the mold may include a convex insert having at least one convex surface and a concave insert having at least one concave surface, where the Fresnel surface may be formed on the at least one convex surface.

"Optical article," according to the disclosure, is defined as a transparent or translucent object through which a person on one side of the optical article may visually perceive an object on the opposite side. Examples of optical articles include sunglasses, fashion lenses, non-prescription and prescription lenses or patches, sport masks, and goggles.

Any embodiment of any of the disclosed compositions and/or methods can consist of or consist essentially of— rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

BRIEF DESCRIPTION OF THE FIGURES

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 5-7 depict methods for making an optical article.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
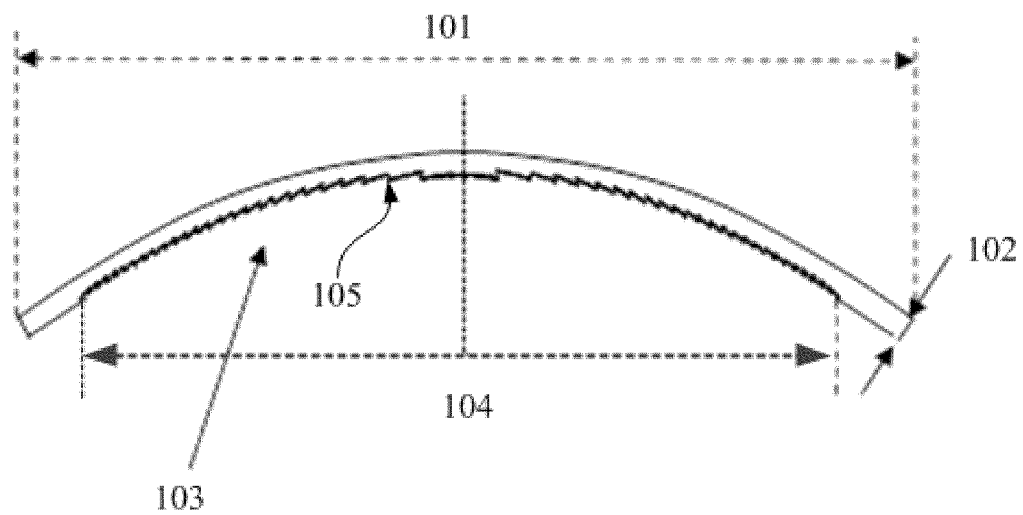
FIG. 1 depicts an optical article having a Fresnel microstructure.

Referring now to FIG. 1, shown is optical article 100. Optical article 100 has diameter 101, center thickness 102, radius 103, and Fresnel microstructure 105. Fresnel microstructure 105 may have defined step heights and widths and may be formed on optical article over length 104, which may be smaller than diameter 101. For example, diameter 101 may be in the range of about 50 mm to about 130 mm, and preferably about 80 mm to 100 mm; length 104 may be in the range of about 50 mm to about 120 mm, and preferably about 70 mm to 90 mm; center thickness 102, for example, may be in the range of about 0.25 mm to 1.5 mm, and preferably about 0.5 mm to about 1.0 mm; and radius 103, for example, may be in the range of about 40 mm to 1060 mm, and preferably about 60 mm to about 530 mm. Fresnel microstructure 105 may have a step height ranging from about 25 μm to about 250 μm and may have a step width ranging from about 5 μm to about 500 μm.

Figure 2:
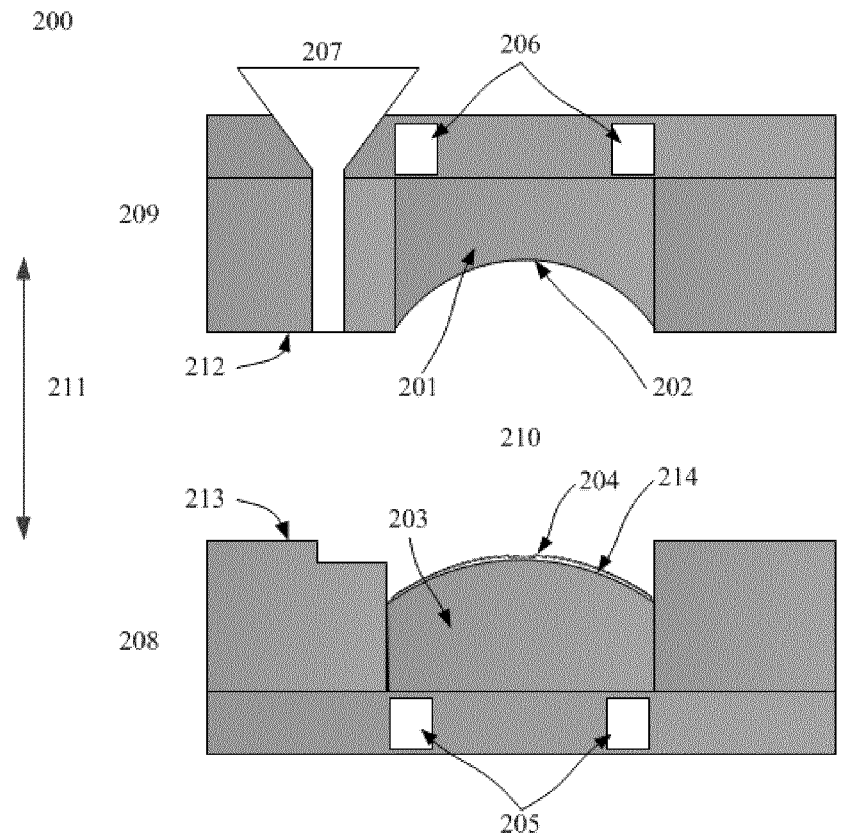
FIG. 2 depicts an opened injection molding machine.
Figure 3:
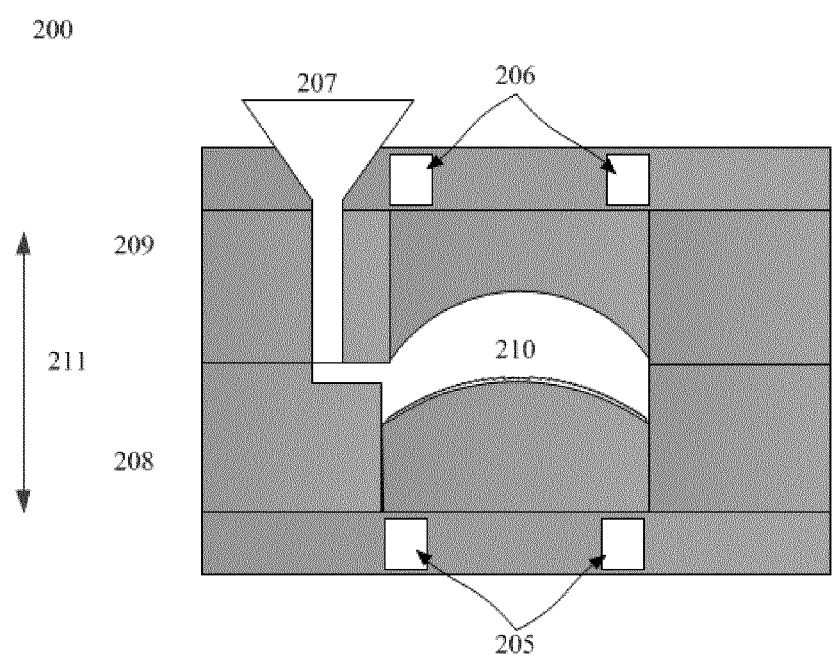
FIG. 3 depicts a closed injection molding machine.

Referring now to FIGS. 2 and 3, shown is mold 200 that includes two half-blocks 208, 209 that can move relative to each other, for example, in translation along axis 211 between an open configuration (as shown in FIG. 2) giving direct access to mold cavity 210 and a closed configuration (as shown in FIG. 3) in which half-blocks 208, 209 make contact via junction faces 212, 213 in order to form mold cavity 210. Half-block 209 may include injector 207 for injecting a thermoplastic material into cavity 210.

As shown in FIGS. 2 and 3, each half-block 208, 209 are provided with its own heat-transfer means. In one aspect, heat-transfer means of half-blocks 208, 209 may be heat sources 205, 206 that are in thermal communication with half-blocks 208, 209. Heat sources 205, 206 may be, for example, an internal circuit for circulating a heat-conveying fluid, resistance elements, internal circuits for circulating a gas, convention means, etc. Heat sources 205, 206 are capable of heating or cooling their respective half-block.

Heat source 205 may be independent of heat source 206. The independence of heat sources 205 and 206 makes it possible to achieve finer regulation of temperature gradient of half-blocks 208, 209, mold cavity 210, and mold 200.

Half-block 208 includes removable insert 203, and half-block 209 includes removable insert 201. Removable insert 203 may be a convex insert having Fresnel surface 204 formed on surface 214 of removable insert 203. Removable insert 201 may be a concave insert and includes surface 202.

Figure 4:
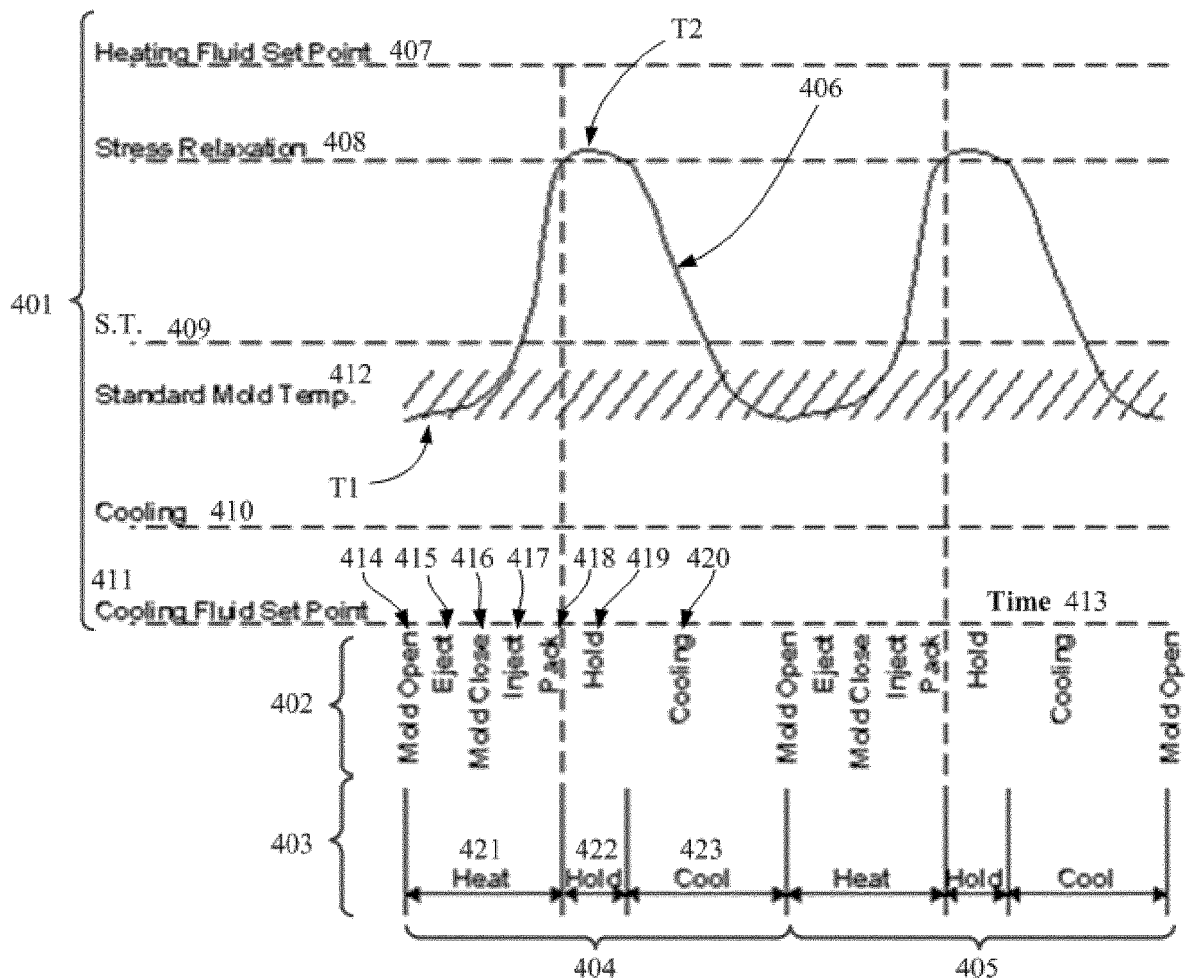
FIG. 4 depicts a graph showing how the temperature of the mold varies as a function of time during successive steps of the molding techniques using a heat/cool cycle for making optical articles.

Referring now to FIG. 4, shown is graph 400 of how temperature of mold 200 varies as a function of time during successive steps of the molding techniques using a heat/cool cycle for making optical articles. Graph 400 illustrates the relationship between time 413 (horizontal axis) and mold cavity surface temperature 401 (vertical axis) in addition to injection molding machine actions 402 at different mold temperature control phases 403 of example heat/cool cycles 404 and 405. In this manner, graph 400 includes heating fluid set point temperature 407; cooling fluid set point temperature 411; standard mold temperature 412; and stress relaxation temperature 408, softening temperature 409, and cooling temperature 410 for an example thermoplastic material. Furthermore, graph 400 includes the mold temperature control phases 403, which indicate when the temperature of the mold is heated 421, held 422, and cooled 423. Heat/cool cycles 404 and 405 may include the following injection molding machine actions: mold open 414, eject 415, mold close 416, inject 417, pack 418, hold 419, and cooling 420, as illustrated in graph 400. The surface temperature of the mold cavity throughout heat/cool cycles 404 and 405 is indicated by curve 406.

In one aspect, a surface temperature of mold cavity may be set to cooling temperature T1, which is below a softening temperature of the thermoplastic material. A thermoplastic material's softening temperature may be determined, for example, by using a specific type of deflection-based test. For example, the Vicat softening test may be used (see, e.g., ASTM Publication D 1525-91). This test determines the temperature at which a flat-ended needle of 1 mm² circular cross-section will penetrate a thermoplastic specimen to a depth of 1 mm under a load of 1 kg using a selected uniform rate of temperature rise (typically 50±5° C./h (Rate A) or 120±12° C./h (Rate B)). The temperature at which this penetration occurs is known as the Vicat softening temperature. Examples of Vicat softening temperatures include 72° C. for ethylene vinyl acetate, 97° C. for polystyrene, 128° C. for high density polyethylene, 153° C. for polypropylene, and 261° C. for Nylon 66.

Cooling temperature T1, for example, may be in the range of about 5° F. to about 150° F. below the softening temperature.

Referring back to FIG. 4, after mold cavity has been set to cooling temperature T1, mold close 416 machine action may be carried out, followed by pack 418 machine action. During pack 418 machine action, a compacting pressure may be applied to the thermoplastic material. Applied compacting pressure, for example, may be in the range of about 100 psi to about 20,000 psi, and preferably in the range of about 500 psi to about 5,000 psi.

Subsequently or concurrently, the surface temperature of the mold cavity may be raised to heating temperature T2 that is higher than cooling temperature T1. Heating temperature, for example, may be in the range of about 20° F. to about 150° F., and preferably in the range of about 30° F. to about 100° F., higher than cooling temperature T1.

Next, hold 419 machine action and hold 422 control phase may be carried out in which the surface temperature and the compacting pressure are maintained for an amount of time. Finally, cooling 420 machine action and cool 423 control phase may be carried out in which the surface temperature of the mold is lowered to the cooling temperature T1. Subsequently, mold open 414 and eject 415 machine action may be carried out to produce an optical article. Steps 414-420 may then be repeated.

Referring now to FIG. 5, shown is method 500 for making an optical article. At step 501, the surface temperature of a mold cavity is set to a cooling temperature. At step 502, the mold cavity is injected with a thermoplastic material. At step 503, a compacting pressure is applied to the thermoplastic material. At step 504, the surface temperature of the mold cavity is raised to a heating temperature. At step 505, the temperature of the mold cavity is lowered to cooling temperature.

Referring now to FIG. 6, shown is method 600 for making an optical article. At step 601, the surface temperature of a mold cavity is set to a cooling temperature. At step 602, the mold cavity is injected with a thermoplastic material. Next, steps 603 and 604 begin simultaneously so that raising the surface temperature of the mold cavity to a heating temperature and applying a compacting pressure to the thermoplastic material occur at the same time. At step 605, the temperature of the mold cavity is lowered to cooling temperature.

Referring now to FIG. 7, shown is method 700 for making an optical article. At step 701, the surface temperature of a mold cavity is set to a cooling temperature. At step 702, the mold cavity is injected with a thermoplastic material. At step 703, the surface temperature of the mold cavity is raised to a heating temperature. At step 704, a compacting pressure is applied to the thermoplastic material. At step 705, the temperature of the mold cavity is lowered to cooling temperature.

EXAMPLES

Example 1: Injection Molding of Fresnel Patches

Injection molding experiments for making Fresnel patches were performed using the a Texin SUN-3006 TPU thermoplastic material having the following properties:

| | |
|---|---|
| Glass transition temperature ($T_g$) | −40° C. (−40° F.) |
| Softening temperature ($T_s$) | 109° C. (228° F.) |
| Degradation temperature ($T_d$) | 275° C. (527° F.) |
| Hardness | 90 A Scale |
| Light transmission | 92.8% |
| Refractive Index | 1.503 |

A convex insert having the following properties was used:

| | |
|---|---|
| Diameter: | 73 mm |
| Radius: | 75 mm |
| Surface: | Fresnel surface |
| Diopter/Design: | −4D Spheric and −8D Aspheric |
| Material: | Steel |

A concave insert having the following properties was used:

| | |
|---|---|
| Diameter | 73 mm |
| Radius | 75 mm |
| Surface: | Smooth surface |
| Diopter/Design: | Spheric and −1D Toric |
| Material | Steel |

A high speed injection molding machine ARBURG ALL-ROUNDER 420C was used having the following operating parameters:

| | |
|---|---|
| Maximum injection speed: | 20.05 in/second |
| Maximum injection pressure: | 36,259 psi |
| Mold: | 73 mm single-cavity injection -coining mold. |

A Mokon Heat/Cool Thermolator was used during the experiments.

Molding experiments using the ARBURG ALL-ROUNDER 420C high speed injection molding machine equipped with a 73 mm diameter single-cavity injection-compression mold. For temperature control, heat/cool switching was implemented only on the inserts that formed the cavity instead of the whole mold to expedite the cycle. The Mokon dual-zone heat/cool thermolator capable of altering between a maximum temperature of 500° F. and a minimum temperature of 77° F. with chilled water was used to regulate the temperature of the inserts during heat/cool switching. An additional water-heat single-zone thermolator was used to maintain the mold at a constant temperature.

With the high speed injection molding setup, injection molding experiments of 73 mm diameter, spheric −4D Fresnel patches were conducted using a Fresnel convex insert and a smooth concave insert. After several process tweaking iterations, Fresnel patches with center thickness of 0.5-0.6 mm were achieved. Below were the process parameters that gave the best results:

Injection speed: 3 stages 2.50/2.50/2.50 inch/second
Injection pressure: 3 stages 25,000/24,000/24,000 psi
Shot size: 1.76
Extruder delay: 50
Back pressure: 500 psi
Barrel (or melt) temperature: 4 zones 435° F.-435° F.-435° F.-435° F.
Mold temperature: 100° F. (with a water-heat thermolator)
Compacting pressure: 1,000 psi
Compacting time: 10 seconds
Hold/Cooling time: 350 seconds
Mokon thermolator heat/cool temperature settings for inserts: heat to 150° F. and cool to 105° F. The following heat/cool switching sequence was used: switch Mokon from heat to cool when cooling time has 300 seconds left then back to heat with 40 seconds remaining in cycle.

The resulting Fresnel patches, however, did not have sufficient rigidity at a thickness of 0.5 mm to hold the intended shape. Therefore, the thickness was increased to 1.0 mm, which resulted in Fresnel patches having sufficient flexibility to conform to the backside of a lens as well as sufficient integrity to maintain their shape.

The microstructure replication quality was examined by comparing microscopic cross-section pictures of an injection-molded TPU patch to a silicone (Dow Corning Sylgard 184) replicate of the Fresnel insert. The cross-section pictures of the TPU patch were found to be almost identical to those of the silicone replicate. Further comparisons of the TPU patch to the microstructures on the Fresnel insert showed very good agreements as well. Hence, a high speed injection-compression molding with mold temperature heat/cool cycling process was found to be certainly capable of producing TPU Fresnel patches with good microstructure replication quality.

To verify the effect of mold (or insert in this case) temperature heat/cool cycling on microstructure replication quality, further injection molding experiments were performed using identical process parameters listed above except there was no heat/cool cycling. The mold and insert temperatures were maintained constantly at about 80-85° F. Microscopic cross-section pictures of a resulting TPU Fresnel patch were compared to those of a patch made with heat/cool cycling. The result indicated that a heat/cool cycling is needed to obtain a well-defined replication of the Fresnel structures on the insert. Without heat/cool cycling, the replicated structures were rounded and dull.

In addition to the microscopic cross-section picture comparisons, the quality of the optical articles with Fresnel microstructures was subjectively judged through the examination of an end product. A pair of demonstrator sunglasses having a center thickness of 1.0 mm −4D spheric Fresnel patches sticking to the backside of each lens was produced and given to users. Positive feedback was received as the sunglasses received much better clarity than those made for comparison sunglasses which had Fresnel microstructures produced by hot-embossing.

To further demonstrate the capability of the process, injection molding evaluations of 73 mm diameter −8D with cyl. −1D aspheric Fresnel patches were conducted using the same process parameters listed above for making the −4D spheric Fresnel patches. Microscopic cross-section pictures of the resulting −8D/−1D Fresnel patches showed almost identical features to the silicone replicate of the Fresnel insert suggesting a very good replication of the microstructures.

A processor or processors can be used in performance of the operations driven by the example tangible computer-readable media disclosed herein. Alternatively, the processor or processors can perform those operations under hardware control, or under a combination of hardware and software control. For example, the processor may be a processor specifically configured to carry out one or more those operations, such as an application specific integrated circuit (ASIC) or a field programmable gate array (FPGA). The use of a processor or processors allows for the processing of information (e.g., data) that is not possible without the aid of a processor or processors, or at least not at the speed achievable with a processor or processors. Some embodiments of the performance of such operations may be achieved within a certain amount of time, such as an amount of time less than what it would take to perform the operations without the use of a computer system, processor, or processors, including no more than one hour, no more than 30 minutes, no more than 15 minutes, no more than 10 minutes, no more than one minute, no more than one second, and no more than every time interval in seconds between one second and one hour.

Some embodiments of the present tangible computer-readable media may be, for example, a CD-ROM, a DVD-ROM, a flash drive, a hard drive, or any other physical storage device. Some embodiments of the present methods may include recording a tangible computer-readable medium with computer-readable code that, when executed by a computer, causes the computer to perform any of the operations discussed herein, including those associated with the present tangible computer-readable media. Recording the tangible computer-readable medium may include, for example, burning data onto a CD-ROM or a DVD-ROM, or otherwise populating a physical storage device with the data.

The embodiments in the Example section are understood to be embodiments of the invention that are applicable to all aspects of the invention, including compositions and methods.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

The invention claimed is:

1. A method for producing an optical article, the method comprising:
    (a) setting a surface temperature of a mold cavity to a cooling temperature at least 5° F. to 150° F. lower than a softening temperature of a thermoplastic material;
    (b) injecting the mold cavity with the thermoplastic material, the mold cavity including a Fresnel surface;
    (c) applying a compacting pressure to the thermoplastic material;
    (d) raising the surface temperature of the mold cavity to a heating temperature at least 20° F. higher than the cooling temperature; and
    (e) lowering a temperature of the mold cavity to the cooling temperature to form an optical article;
wherein the thermoplastic material is a thermoplastic polyurethane (TPU), polyvinylchloride (PVC), or thermoplastic elastomer (TPE).

2. The method of claim 1, wherein the heating temperature is approximately 30° F. to 100° F. higher than the cooling temperature.

3. The method of claim 1, wherein applying the compacting pressure to the thermoplastic material and raising the surface temperature of the mold cavity begin simultaneously.

4. The method of claim 1, wherein raising the surface temperature of the molding cavity begins before applying the compacting pressure to the thermoplastic material.

5. The method of claim 1, wherein the Fresnel surface is configured to form a Fresnel microstructure, the Fresnel microstructure having a step height ranging from approximately 10 μm to 500 μm and a step width ranging from approximately 5 μm to 250 μm.

6. The method of claim 1, wherein the compacting pressure and/or the heating temperature are maintained for at least 5 seconds.

7. The method of claim 5, wherein the compacting pressure and the heating temperature are maintained for 10 seconds to 60 seconds.

8. An injection molding system for producing an injection molded optical article, the injection molding system comprising:
    a mold having a mold cavity for receiving a thermoplastic material, the mold cavity including a Fresnel surface;
    a heat source in thermal communication with the mold; and
    a processor configured to successively perform:
        (i) controlling the heat source to set a surface temperature of the mold cavity to a cooling temperature at least 5° F. to 150° F. lower than a softening temperature of the thermoplastic material before an injection of said thermoplastic material in the mold cavity;
        (ii) after the injection of said thermoplastic material in the mold cavity, controlling the heat source to raise the surface temperature of the mold cavity to a heating temperature at least 20° F. higher than the cooling temperature; and
        (iii) controlling the heat source to lower a temperature of the mold cavity to the cooling temperature;
wherein the thermoplastic material is a thermoplastic polyurethane (TPU), polyvinylchloride (PVC), or thermoplastic elastomer (TPE).

9. The injection molding system of claim 8, comprising a thermoplastic injector configured to perform:
    before step (ii), injecting the thermoplastic material into the mold cavity of the mold; and
    applying a compacting pressure to the thermoplastic material.

10. The injection molding system of claim 9, wherein 1) applying the compacting pressure to the thermoplastic material and raising the surface temperature of the mold cavity begin simultaneously; or 2) raising the surface temperature of the molding cavity begins before applying the compacting pressure to the thermoplastic material.

11. The injection molding system of claim 10, wherein the Fresnel surface is configured to form a Fresnel microstructure, the Fresnel microstructure having a step height ranging from approximately 10 μm to 500 μm and a step width ranging from approximately 5 μm to 250 μm.

12. The injection molding system of claim 9, wherein:
    the processor is configured to:
        maintain the heating temperature for a period of time;
    the injector is configured to:
        maintain the compacting pressure for the period of time.

13. The injection molding system of claim 8, wherein the mold includes a convex insert having at least one convex surface and a concave insert having at least one concave surface, wherein the Fresnel surface is formed on the at least one convex surface.

* * * * *